(12) United States Patent
Crocker (10) Patent No.: US 9,829,565 B1
(45) Date of Patent: Nov. 28, 2017

(54) UNDERWATER ACOUSTIC BEACON LOCATION SYSTEM

(71) Applicant: Steven E Crocker, Bristol, RI (US)

(72) Inventor: Steven E Crocker, Bristol, RI (US)

(73) Assignee: The United States of America as represneted by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/389,508

(22) Filed: Dec. 23, 2016

Related U.S. Application Data

(60) Provisional application No. 62/297,179, filed on Feb. 19, 2016.

(51) Int. Cl.
*G01S 15/18* (2006.01)
*G01S 5/18* (2006.01)

(52) U.S. Cl.
CPC .................... *G01S 5/183* (2013.01)

(58) Field of Classification Search
CPC ....................................... G01S 5/183
See application file for complete search history.

(56) References Cited

U.S. PATENT DOCUMENTS 4,559,621 A * 12/1985 Delignieres ........... G01S 5/0036
367/130
4,635,236 A * 1/1987 Roberts ................. G01S 15/874
367/130

* cited by examiner

*Primary Examiner* — Daniel Pihulic
(74) *Attorney, Agent, or Firm* — James M. Kasischke; Michael P. Stanley (57) ABSTRACT

A method using a tow body and sensor array for locating an underwater location beacon is provided. The steps of the method are moving the body and array in a direction of motion; orientating the array orthogonal to the direction of motion; beamforming acoustic conical beams from the array onto a seafloor; detecting a time series of acoustic data channels from the beacon; converting the data channels into spatial beams of acoustic frequency; determining if a signal of the underwater location beacon is present from each spatial beam; calculating likelihood functions for locations of the beacon to represent an area of the seafloor from which the signal of the underwater location beacon is to have originated; accumulating likelihood functions for the location of the underwater location beacon over the course of a search pattern; and producing a grid for a beacon location based on the likelihood functions.

10 Claims, 8 Drawing Sheets

UNDERWATER ACOUSTIC BEACON LOCATION SYSTEM

The present application claims the benefit of U.S. Provisional Application Ser. No. 62/297,179 filed on Feb. 19, 2016 by the inventor, Steven E. Crocker and entitled "Underwater Acoustic Beacon".

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

An acoustic detection system is provided in which the detection system can search for and can locate an underwater location beacon.

(2) Description of the Prior Art

Various methods of detecting, locating and recovering an Underwater Location Beacon (ULB) have been proposed. Methods for locating a ULB include cross-correlating acoustic signals received by two or more hydrophones in which the hydrophones are separated at a discernable distance.

In Raudsep (U.S. Pat. No. 3,559,161) a system is disclosed where a cross-correlation calculation is used to estimate a distance to an acoustic beacon. While use of the system provides an improved location estimate relative to that provided by a single hydrophone; the system does not provide a signal gain or a greater detection range than can be achieved by using an array of spatially distributed sensors.

Methods to aid the search for underwater beacons such aircraft data recorders, include improvements to the beacons themselves. In Shope (U.S. Pat. No. 4,951,263), a ULB is disclosed that transmits a spread spectrum acoustic waveform as opposed to time gated signals. While this method can increase the range at which a spread spectrum signal transmitted by a ULB could be detected; the proposed method would require the replacement of all underwater beacons used in all commercial aircraft. This would be a considerable expense.

In Fabre and Bignolais (U.S. Pat. No. 8,727,263); a method is disclosed where a beacon is physically relocated to a position where the beacon is more likely to be detected. In particular, the beacon is expelled from an aircraft upon entry of the downing aircraft into the water. The beacon is designed to float free of the downed aircraft and is retained by a lightweight tether where the beacon can ascend from the depth of the seafloor to be detected by a search platform.

While this method may improve the probability of locating a downed aircraft; the system needed for the method requires potentially expensive modifications not only to the beacon, but to the downed aircraft was well. Also, it is unknown how reliable the proposed beacon deployment and tethering method would be in a real world environment.

A method to recover the data, but not the physical recorder, is disclosed in Flynn (U.S. Pat. No. 8,005,584). The cited reference proposes the recovery of data from a flight data recorder by using an acoustic data link to transmit data upon command from a recovery platform. While the method facilitates data recovery by eliminating the requirement of physical access to the aircraft debris field on the seafloor; the method does not provide an advantage for detecting and locating the aircraft data recorder in a first instance. The data recovery method would also require widespread and costly changes to commercial airliners.

While various attempts have been made to resolve the problem of detecting and locating a ULB on the seafloor; the proposed improvements require costly and widespread modifications. As such, there is a continuing need for a system and method of use that increases the distance at which a ULB can be detected; yields a precise estimate of the beacon location; and does not require costly modifications to the aircraft, data recorders or acoustic beacons attached to the recorders.

Underwater Location Beacons (ULB) of the type to which this invention pertains, are typically affixed to cockpit voice and flight data recorders used in commercial aircraft. The ULB presently used is a battery powered transducer that transmits an acoustic signal. The acoustic signal is intended to be received and to aid a search and recovery effort following the entry of an aircraft into a body of water.

When an aircraft equipped with a data recorder enters the water; the ULB is energized by a water activated battery. Once energized, the ULB transmits an acoustic waveform at a fixed interval of approximately one second until the battery is exhausted and the beacon ceases to operate. Since a precise estimate of the location where an aircraft enters the water may not be available; the search area can be large with the area sometimes measured in thousands of square kilometers. Due to the limited operating life of the ULB and the potential for a large search area; a ULB detection system preferably has the following features.

The ULB detection system must be able to be rapidly transported to the location where the aircraft was estimated to have entered the water and must be rapidly placed into operation so as to maximize the time to search for the ULB prior to depletion of the ULB battery. Also, the system must maximize the rate at which an area of the seafloor can be searched for signals transmitted by a ULB and the system must be able to detect the ULB signal at the greatest practical distance.

Furthermore, the system must produce an estimate of the ULB location to aid in recovery of the ULB and the flight data recorder to which the ULB is attached. Also, the system must be capable of detecting and estimating the position of the ULB located in water depths ranging from arbitrarily shallow to full ocean depth in the region of an abyssal plain.

SUMMARY OF THE INVENTION

Accordingly, it is a primary object and general purpose of the present invention to provide a system to search for an Underwater Location Beacon (ULB) in varying water depths.

It is a further purpose of the present invention to provide a method of use for a linear acoustic sensor array in which the method produces a precise estimate for the location of a ULB using data collected during a single, non-maneuvering pass of a typical search pattern.

It is a still further object of the present invention to detect the presence of a signal transmitted by the ULB and to provide an unambiguous estimate of the ULB on the seafloor from which that signal originated during a single pass of the tow body.

To attain the objects of the present invention, a system and method of use is disclosed that includes an underwater body that can be towed behind a ship. The underwater tow body is equipped with a linear sensor array comprising a plurality of hydrophones. The tow body includes electronics to provide electric power to the sensor array and components to transmit electrical signals from the sensor array to a data processor located on the ship. The processor uses the data provided by the tow body to detect and estimate the position of an acoustic signal transmitted by the ULB.

BRIEF DESCRIPTION OF THE DRAWINGS

Other objects, features and advantages of the present invention will be apparent with reference to accompanying drawings in which is shown an illustrative embodiment of the invention, wherein corresponding reference characters indicate corresponding parts throughout the several views of the drawings and wherein.

DETAILED DESCRIPTION OF THE INVENTION

A known passive sonar equation is used to estimate the maximum distance at which an underwater tow body is likely to detect an acoustic signal transmitted by the Underwater Location Beacon (ULB). The Figure of Merit (FOM) equation for a passive sonar detection system is defined as the maximum attenuation in the acoustic intensity of the transmitted signal that can occur for successful detection of the transmitted signal. The FOM is determined in decibels as $$FOM=SL-NL+DI-DT \qquad (1)$$

where "SL" is the source level of the ULB signal in decibels referenced to one micro-pascal at one meter from the acoustic center of an acoustic transducer (dB re 1 uPa@m); "NL" is the spectrum level of interfering noise in decibels referenced to one micro-pascal squared in a one hertz band (dB re 1 uPa²/Hz), "DI" is the directivity index of the acoustic sensor in decibels and "DT" is the detection threshold of the acoustic sensor in decibels.

Sonar performance parameters that can apply in a search for an aircraft data recorder ULB in the deep ocean are: SL=160 dB re 1 uPa@1 m; NL=45 dB re 1 uPa²/Hz; DI=3 dB; DT=25 dB; and FOM=88 dB. The provided parameters invoke a number of simplifying assumptions including moderate weather conditions with wind speeds of five to ten meters per second, an acoustic sensor with a hemispherical directional response and a simple square law detector providing a conservative estimate for the detection threshold of a typical ULB signal.

The attenuation of the ULB signal results from a geometric divergence which is assumed to be the result of spherical spreading. Absorption of sound by seawater is also an important factor at the ULB operating frequency of 37.5 kHz, with an absorption coefficient of approximately $\alpha=0.005$ decibels per meter (dB/m) near the seafloor in the deep ocean. Thus, the transmission loss TL is computed as $$TL=20 \log_{10}R+\alpha R \qquad (2)$$

where "R" is a distance from an underwater location beacon to a linear sensor array.

The maximum distance of a known detection of a ULB is 3.5 kilometers. This distance is the predicted detection range R based on consideration of Equations (1) and (2) together with the parameters for SL, NL, DI, DT and alpha. Any sensor system for detecting a ULB signal must operate in relatively close proximity to the seafloor in order to minimize signal attenuation and to increase the likelihood of detecting the acoustic signal transmitted by the ULB.

Referring now to FIG. 1A thru FIG. 1D, the present detection system comprises a tow body 10 attachable to a tow cable 100 by a pad eye 12 on a top surface of the tow body. The tow cable 100 provides an attachment to a surface ship (not shown) used to pull the tow body 10 through the water. In addition, the tow cable 100 includes electrical conductors that provide electrical power or a coaxial cable (not shown) to support a digital data link between the surface ship and the tow body 10. The tow body 10 also comprises a vertical stabilizer 14 for stable orientation of the tow body when towed through the water.

The underside of the tow body 10 supports a bracket 16 for mechanical attachment of a pressure vessel 18 and an acoustic sensor array 20 to the tow body. The bracket 16 is shaped to provide a set of skids 17 that support the tow body 10 when placed on a horizontal surface, such as the deck of a ship, and to prevent damage to the sensor array 20 when the sensor array is attached to the tow body.

The acoustic sensor array 20 comprises a linear arrangement of hydrophones (not shown) oriented perpendicular to a longitudinal axis 30 of the tow body 10. Thus the hydrophones are generally orthogonal to the direction in which the tow body moves through the water when towed. In the present invention, orthogonal is defined as the longitudinal axis of the acoustic sensor array 20 being perpendicular to the movement of the direction of movement of the tow body 10. The tow body 10 is optionally fitted with an underwater location beacon (ULB) 40 that can be activated if the tow body becomes detached from the tow cable 100 and when the ULB is used (if needed) to aid in recovery of the tow body.

The tow body 10 also includes a magnetic heading sensor 41 to determine the direction of the longitudinal axis 30 of the tow body with respect to magnetic north. The tow body 10 further includes a gravity sensor 22 to measure an angular orientation of the tow body relative to the gravity of the Earth and a hydrostatic pressure sensor (collocated with the heading sensor 41) to indicate depth beneath the ocean surface.

Figure 1A:
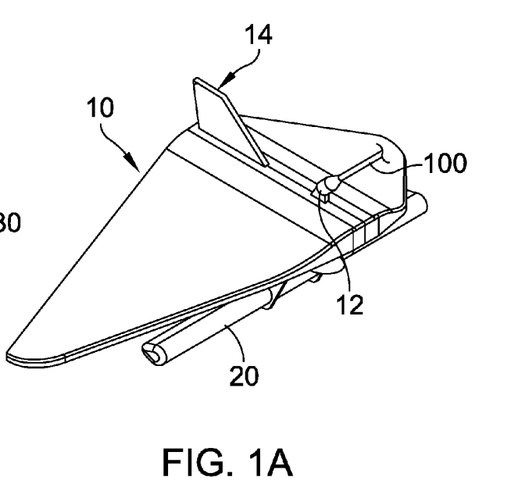
FIG. 1A is a perspective view of an underwater tow body of the present invention.
Figure 1B:
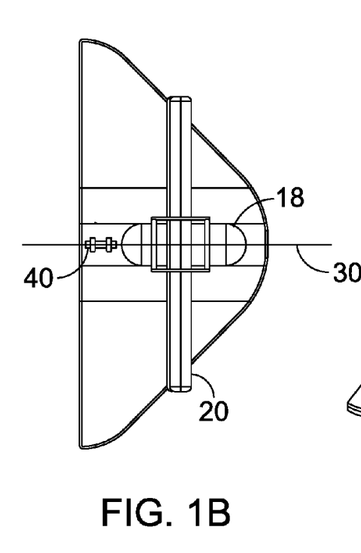
FIG. 1B is a top view of the underwater tow body of the present invention.
Figure 1C:
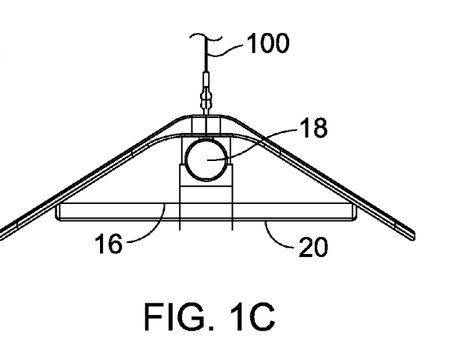
FIG. 1C is a front view of the underwater tow body of the present invention.
Figure 1D:
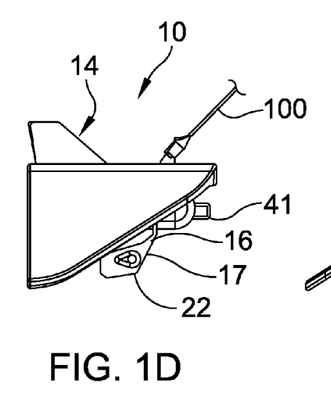
FIG. 1D is a side view of the underwater tow body of the present invention.
Figure 2:
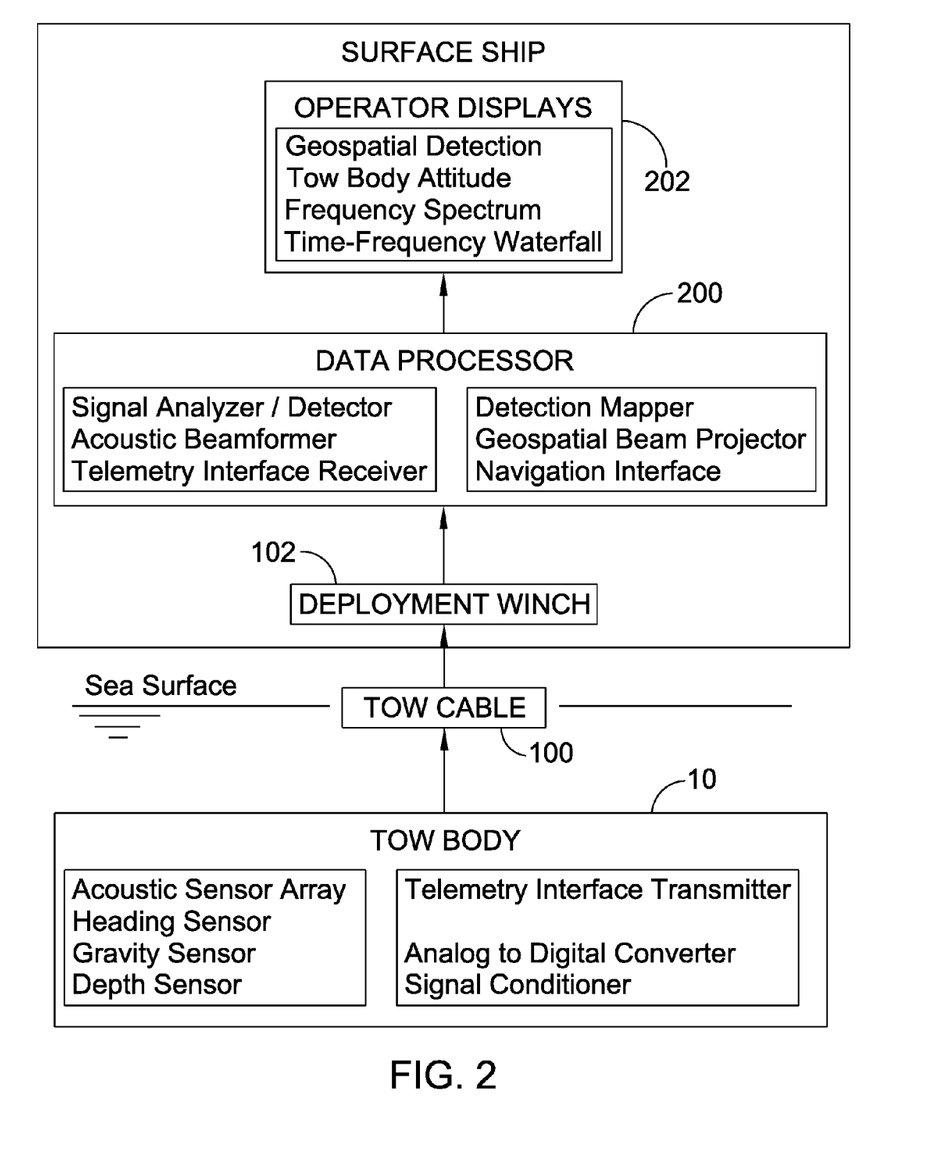
FIG. 2 is a diagram identifying major components of the system of the present invention.

Referring to FIG. 2, data collected by sensors of the tow body 10 are received by an electronic assembly contained in the tow body pressure vessel 18. Electronic circuits of the assembly receive and condition the analog sensor signals prior to a digital conversion. Digital sensor signals are formatted for transmission to the data processor using well-known digital communication standards.

A telemetry interface transmitter of the tow body 10 sends the digital data over the tow cable 100 where the cable is passed from a deployment winch 102 to a data processor 200 on the surface ship. The data is then received by a telemetry interface receiver and stored to memory to be processed by acoustic and geospatial processing algorithms (detailed further in the present application). Data processing results are shown on an operator display 202.

Figure 3:
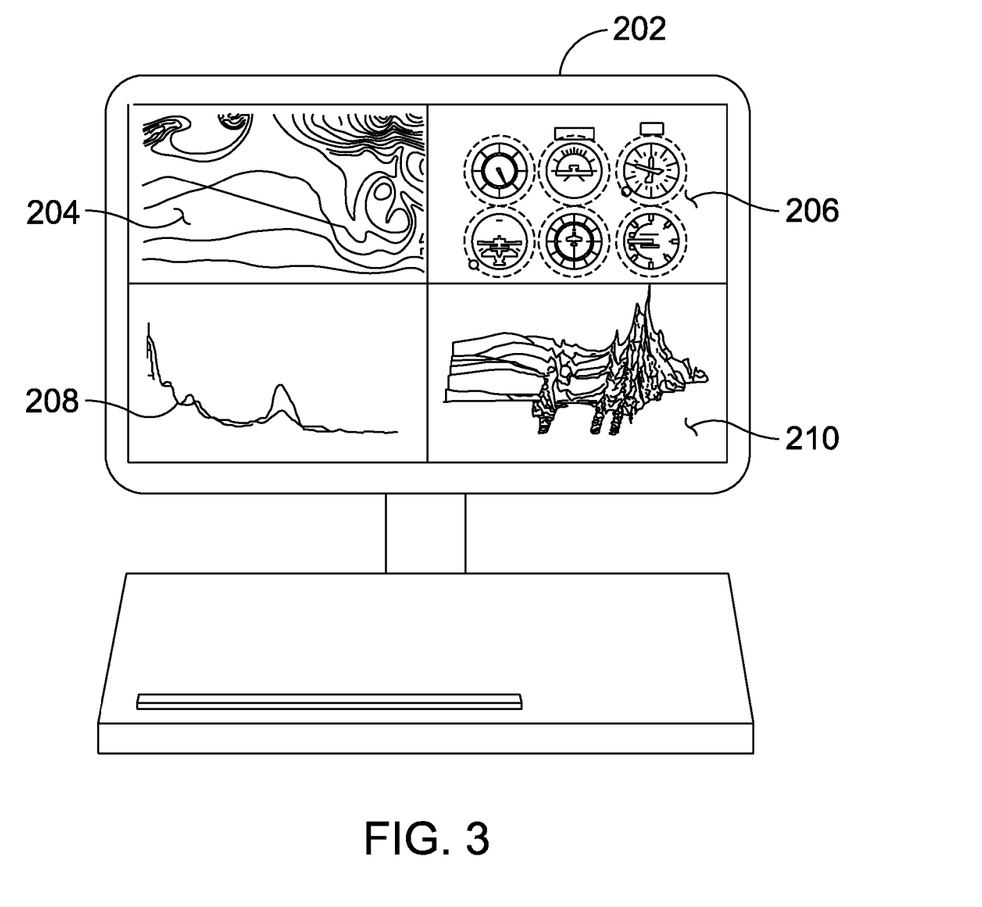
FIG. 3 is a depiction of information collected by the system as displayed to an operator.

As shown in FIG. 3, the operator display 202 provides information to aid in the search effort and to supervise movement of the tow body 10. The operator display 202 includes a geographic summary of the search and ULB detection history in a geodetic referenced display 204. The attitude and status of the tow body 10 includes roll, pitch, yaw, depth below surface and altitude above the seafloor as shown in display 206. The acoustic power spectrum observed by a user selected sensor array beam is shown on display 208. The acoustic power observed in a user specified frequency band is presented to the operator as a function of time and beam angle in a three dimensional "waterfall" display 210.

Figure 4:
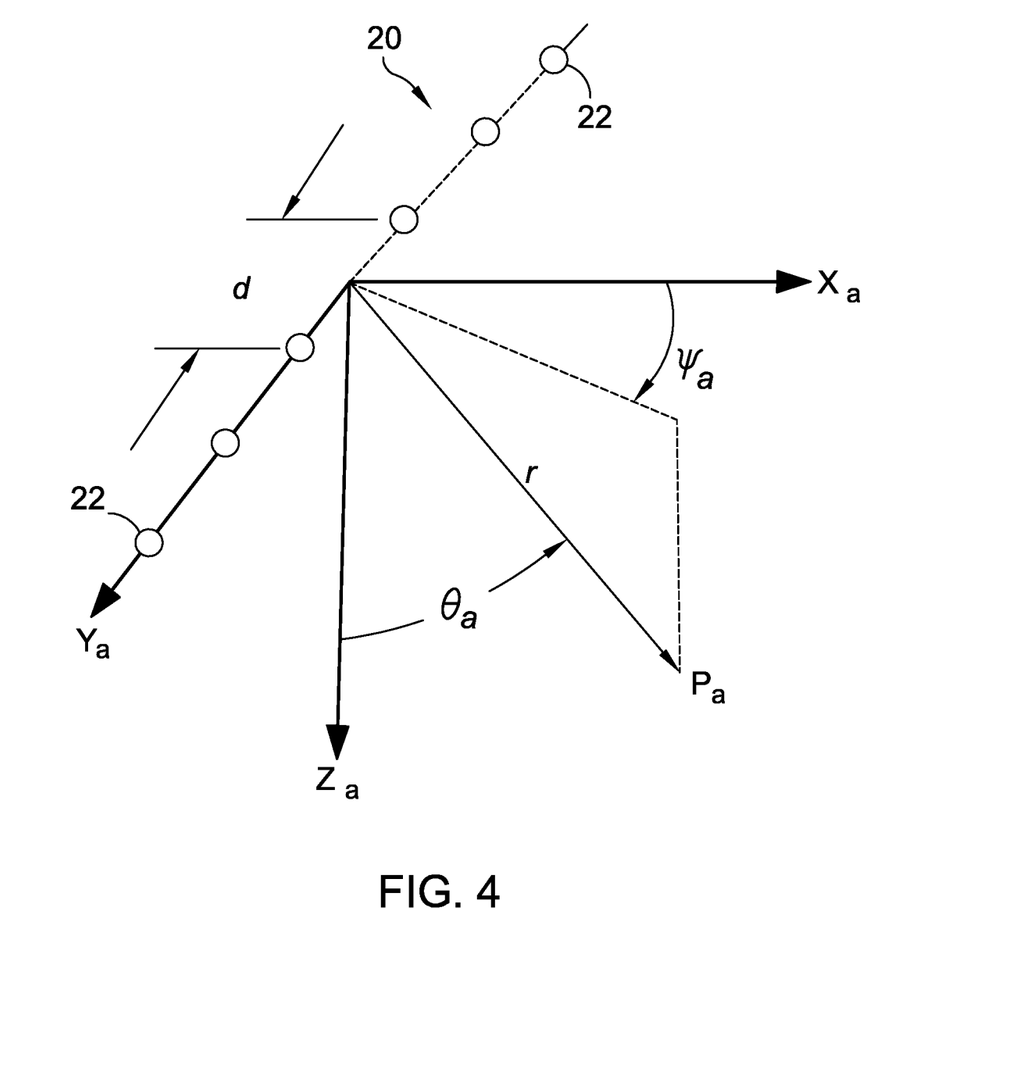
FIG. 4 is a geometry of a linear sensor array of the present invention and a system of coordinates associated with the sensor array.

As shown in FIG. 4, the present invention uses the linear sensor array 20 of acoustic pressure sensors (hydrophones) 22 arranged in alignment. This arrangement improves the maximum distance at which the signal transmitted by a ULB is likely to be detected. The linear sensor array 20 provides an improved directivity index DI for improving the Figure of Merit (FOM) of the detection system—See Equation (1). The directivity index is improved by the spatial response of an array beam pattern—as further described by the use of Equation (3) and Equation (5).

A Cartesian system of coordinates is defined such that the pressure sensors (hydrophones) 22 are arranged in a line along the "$Y_a$" axis with "d" as the spacing between adjacent hydrophones (subscript "a" indicates that the system of coordinates is referenced to the linear sensor array 20). Thus, the $Y_a$ coordinate points in the starboard direction are also relative to the tow body 10. The $X_a$ coordinate points forward and the $Z_a$ coordinate points in the direction defined by a right hand coordinate system. In straight and level flight, the $Z_a$ coordinate would point to the seafloor.

In the figure, a system of spherical coordinates is defined where the coordinates of an arbitrary point $P_a$ in the field is located at an azimuth angle in the $X_a$-$Y_a$ plane of $\psi_a$, a zenith angle from the $Z_a$ axis of $\theta_a$, and at a distance r from the origin (the acoustic center of the linear array 20). The range of $\psi_a$ is +/−90°, while the range of $\theta_a$ is +/−180°. The angle $\psi_a$ is measured in the $X_a$-$Y_a$ plane with the reference line of measurement being the $X_a$ axis while $\theta_a$ is measured from the $Z_a$ axis to the line (vector) that points from the acoustic center of the linear array 20 to the point $P_a$ in the field.

By way of example; the linear sensor array 20 typically comprises thirty-two individual hydrophones 22 spaced at an interval of fifteen millimeters; thereby, resulting in an aperture length of approximately 46.5 centimeters. A beam pattern b for the described linear sensor array 300 is calculated using well-known methods [L. J. Ziomek, *Underwater Acoustics: A Linear Systems Approach*, Academic Press (1985)] as $$b(k_y, \hat{k}_y) = 4 \left[ \frac{\sum_{n=1}^{N/2} \left( w(n) \cos(k_y - \hat{k}_y)\left(n - \frac{1}{2}\right)d \right)}{\sum_{n=1}^{N} w(n)} \right]^2 \tag{3}$$

where N is the number of hydrophones 22 in the linear sensor array 300; n is an index used to identify an individual hydrophone and as the index of summation for Equation (3) where the index varies from 1 to N/2; d is the distance between adjacent hydrophones, and w is an amplitude weighting function applied to the hydrophones. In Equation (3), $k_y$ is the component of the acoustic wavenumber vector that is parallel to the longitudinal axis of the linear sensor array 20 and k "hat" is the component of the acoustic wavenumber vector that is parallel to the longitudinal axis of the linear sensor array to which a given beam is steered. These values are related to angles in spherical coordinates in accordance with Equation (4).

The present analysis employs a Taylor window function [E. Brookner, *Practical Phased Array Antenna Systems*, Artech House (1991)], but other amplitude windows are not precluded from use. The response of the linear sensor array 20 in the direction $\psi_a, \theta_a$ is dependent on the direction to which the main response axis of the beam pattern b is steered $\hat{\psi}_a, \hat{\theta}_a$ such that $$k_y = \frac{2\pi}{\lambda} \sin\theta_a \sin\psi_a \text{ and } \hat{k}_y = \frac{2\pi}{\lambda} \sin\hat{\theta}_a \sin\hat{\psi}_a \tag{4}$$

with $\lambda$ being the acoustic wavelength.

Equation (4) is used to calculate the beam patterns using Equation (3). Given the beam patterns, the Directivity Index DI is calculated as needed to predict the detection range R and to show the usefulness of the method of the present invention.

A computationally efficient method for beamforming the linear sensor array 20 is based on well-known frequency-wavenumber methods as taught by the prior art [J. Capon, "High-Resolution Frequency-Wavenumber Spectrum Analysis", Proceedings of the IEEE, vol. 57 (1969)]. The frequency-wavenumber beamformer transforms N data channels of time series data of M samples each into N frequency spectra. Each hydrophone channel produces a time series of voltage versus time. The Fourier Transform of the time series data is taken such there are N frequency spectra.

For this invention, a frequency spectrum is defined as a representation of the acoustic data as a function of frequency versus time. As stated, the frequency spectra is computed using the Fourier transform of the time series data provided by a hydrophone. The hydrophone represents the signal as a voltage spectrum (volts squared versus frequency).

Each N data channel results in one frequency spectrum; thus there are N spectra. M is the number of data samples in each data channel. Each frequency spectrum is associated with one beam steering angle, wherein the steering angles are uniformly spaced in the cosine of the azimuth angle $\psi_a$.

Figure 5:
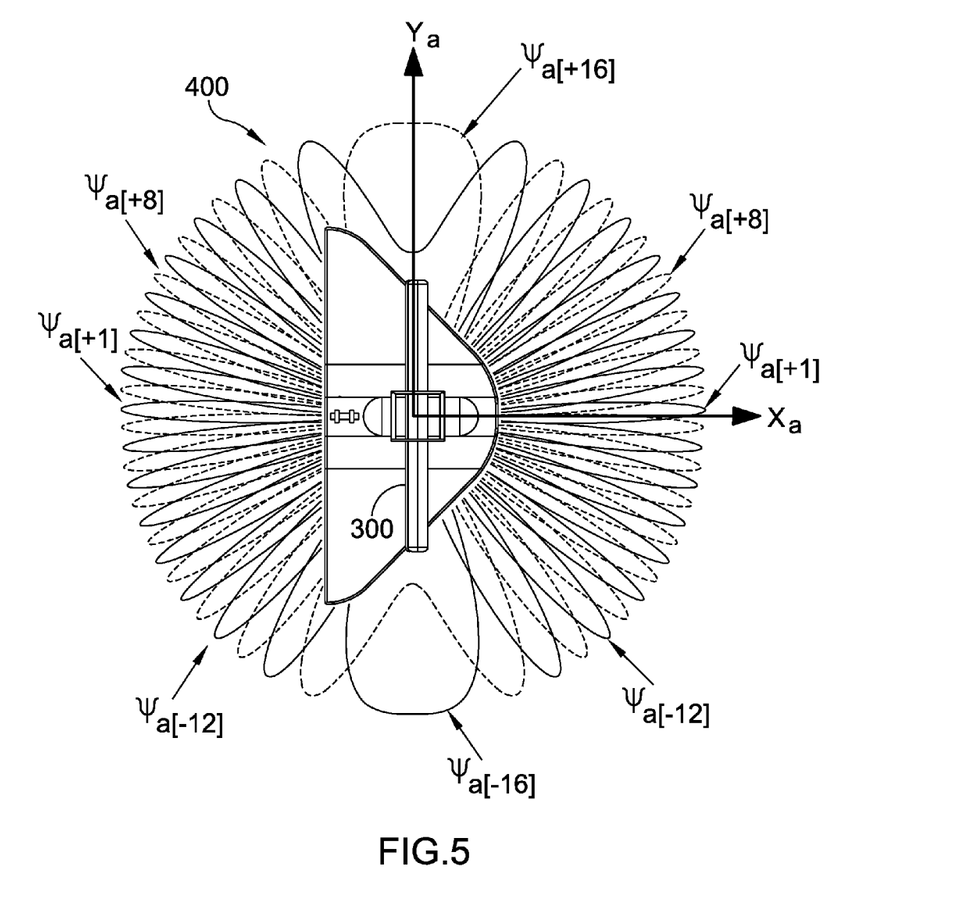
FIG. 5 depicts the tow body and linear sensor array of the present invention with spatial response patterns of the array shown.

FIG. 5 illustrates beam patterns 400 formed by a frequency-wavenumber beamformer when applied to data generated by the linear sensor array 20. A well-known property of linear sensor arrays is that the beam patterns b are axially symmetric about a longitudinal line that passes through the individual sensors. This arrangement results in a conical ambiguity for an arrival direction of an acoustic signal received by the linear sensor array 20.

In a known arrangement where the axis of the linear sensor array 20 is co-linear with a direction of movement; the effect is often referred to as a "left-right ambiguity" since it is generally assumed that the signal arrived from a location in the horizontal plane, but it is not possible to resolve whether the signal arrived from the left or the right relative to a course heading of the deploying surface ship.

Note that the linear sensor array 20 employed by the present invention is oriented perpendicular to the direction of movement of the tow body 10. Therefore, the conical beam patterns are symmetric about the $Y_a$ coordinate; oriented in the port and starboard direction. The present invention results in a forward-aft ambiguity where the side (port or starboard) from which a signal arrives is known unambiguously, but the forward or aft direction is not.

This uncertainly is illustrated in the figure where select beam steering index values are labeled. For example, the beam labeled $\psi_{a[\alpha 1]}$ is a broad cone that intersects the horizontal plane at a few degrees to starboard in the forward and aft directions. Likewise, beam index $\psi_{a[+8]}$ is further to starboard, but is ambiguous in the forward and aft directions. Beam index $\psi_{a[-12]}$ is oriented to port, and is also ambiguous in the forward and aft directions. Only beams $\psi_{a[\pm 16]}$ are unambiguous and are commonly referred to as "end-fire beams" in that the beams are oriented along an axis of symmetry for the linear sensor array 20. It is noted that FIG. 5 uses a view beneath the tow body 10 such that an observer would be looking up at the tow body. The beams with a positive index are to starboard and the beams with a negative index are oriented to port.

The maximum distance at which a ULB signal can be detected is increased by the use of the linear sensor array 20. In particular, the Figure of Merit (FOM) for the detection system is increased as a result of the increased directivity index DI of the linear sensor array 20, as shown by the use of Equation (1). As is known in the art, the directivity index is increased by the directionality of the linear sensor array 20. The directivity index of any array is computed by using well-known Equation (5).

In Equation (5), the directivity index DI for the beam pattern developed by an array of sensors is defined as the ratio of the power output by an omnidirectional sensor located in an isotropic, incoherent noise field to the beamformed output of the linear sensor array 20 in the same noise field, given as $$DI = 10\log_{10}\left(\frac{4\pi}{\int bd\Omega}\right) \quad (5)$$

where $d\Omega$ is the differential element of a solid angle. The differential element is the differential used to define the integral. The difference element represents a solid angle in three-dimensional space. There are 4 pi radians in a sphere.

The directivity index DI for the linear sensor array 20 considered by the present invention is approximately 13 dB at 37.5 kHz (frequency of operation for a typical ULB). Therefore, under the same set of conditions that were employed to estimate the Figure of Merit (FOM) for a known beacon location system, a similar system using the thirty-two element linear sensor array 20 would provide a FOM of 98 dB, a 10 dB improvement.

Beam patterns b are computed using Equation (3). The directivity index for each beam is computed using Equation (5), which in the provided example is approximately 13 dB. The directivity index of an existing beacon is estimated to be 3 dB based on the stated "hemispherical response" of the hydrophone where noise arriving from above is assumed to be shielded by the tow body 10. Thus, the improvement is 10 dB (the difference between the two). The resulting maximum detection range for the system described by this invention is 4.8 kilometers, a 1.3 kilometer improvement over standard practices in the same operating conditions. For example: current pinger locators do not use linear arrays.

Another useful comparison between present detection practices and the system described herein is the total area of the seafloor from which a ULB signal is likely to be detected. Assuming that the tow body 10 is operated five hundred meters above a level seafloor; the area beneath the tow body for which a ULB signal is likely to be detected in present practices is thirty-eight square kilometers. A search system equipped with the linear sensor array 20 would be equally likely to detect a ULB over a seafloor area totaling seventy-two square kilometers—nearly twice the area covered by present beacon location systems.

Data provided by the linear sensor array 20 is also processed to provide a precise estimate of the specific location of a detected ULB. As a result of the symmetry in beam patterns formed by the linear sensor array 20; the most likely location for the origin of a detected ULB signal is defined by the intersection of the conical pattern of the beam (in which the signal was detected) with the seafloor.

Thus, knowledge of the location and altitude of the tow body 10, combined with the beam steering angle in which a ULB signal was detected, can be used to identify the region on the seafloor where the ULB is most likely to be found. The intersection of the conical beam with the seafloor is defined by a conic section, in particular a hyperbola. The area about the hyperbola that may contain the ULB is defined by the width of the main response axis for the various beam steering angles generated by the beamformer. As such, the ULB can be located by many beams as the beams in which the ULB is located will change as the tow body passes by the ULB and the angle from the longitudinal axis of the linear array 20 to the ULB changes.

Figure 6:
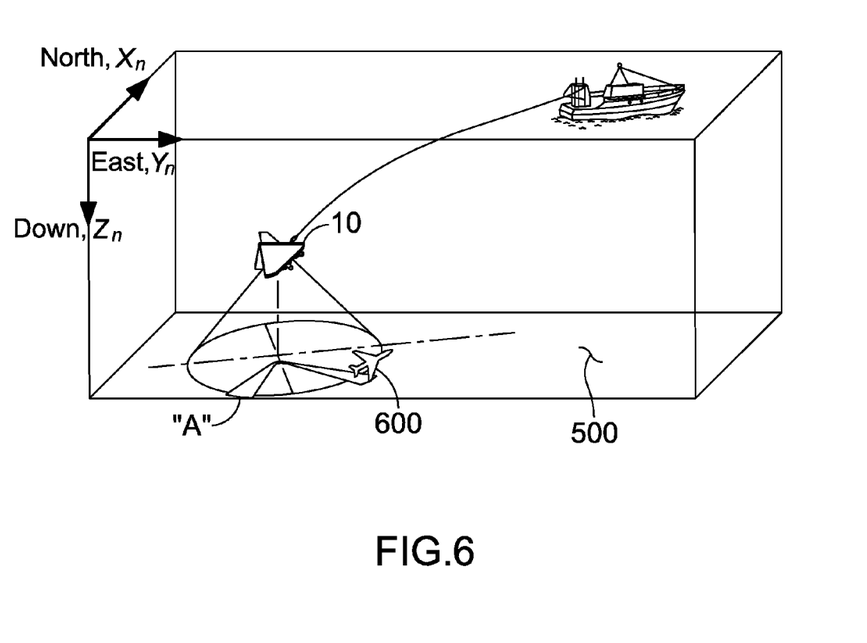
FIG. 6 is an illustration of the method of use of the present invention wherein a tow body searches the seafloor for an underwater location beacon.

FIG. 6 illustrates the projection of the conical beam in which a ULB signal was detected onto the seafloor. The total area of seafloor 500 on which a ULB signal is likely to be detected is illustrated by the circular area beneath the tow body 10. However, the likely location of the ULB (and associated aircraft wreckage 600) is confined to the subset of the total surveillance area defined by intersection A of the conical beam in which the ULB signal was detected with the seafloor 500.

As shown in the figure, the directional response of the linear sensor array 20 identifies the ULB location on the starboard side of the tow body 10. However, the ULB (and aircraft wreckage 600) could be located anywhere within the hyperbolic projection of the detection beam onto the seafloor. Based on a single detection, the ULB is equally likely to be located ahead of, on the starboard beam, or behind the tow body 10. However, when the geolocation data from multiple ULB detections acquired during a single non-maneuvering pass of the tow body 10 are accumulated; a precise location estimate of the ULB location can be developed. The accumulation of detections is based on the ULB "pinging" at a rate of once per second—every ping represents a detection opportunity.

The area of the seafloor 500 on which a detected ULB is likely to be located is generated by projecting the conical beam pattern defined in a moving spherical coordinate system that is relative to the tow body 10 onto a stationary Cartesian coordinate system defined relative to the Earth.

Figure 7:
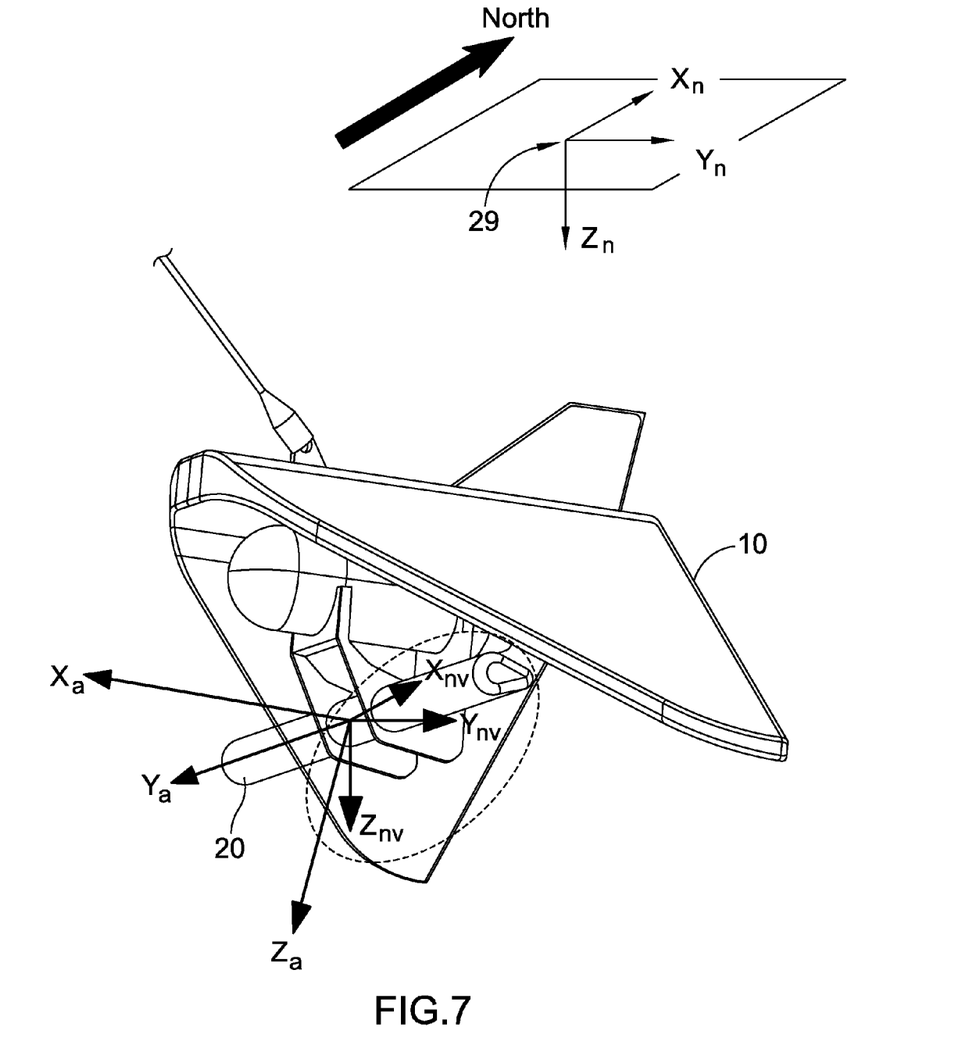
FIG. 7 is an illustration of the tow body and the spatial coordinate systems used to estimate the position of the underwater location beacon on the seafloor.

FIG. 7 illustrates the coordinate systems employed by the present invention. A local North-East-Down (NED) coordinate system, as commonly used to define navigation and ground coordinates is defined relative to an arbitrary point on an ocean surface used as a reference for the search area. The system is defined by three cardinal directions as geodetic North ($x_n$), geodetic East ($y_n$) and Down ($z_n$) relative to the World Geodetic System (WGS 84) ellipsoid model [NIMA Technical Report TR8350.2, Chapter 3 "Department of Defense World Geodetic System 1984, Its Definition and Relationships with Local Geodetic Systems" (2000)].

Coordinate vectors expressed in the local NED coordinate system are denoted with the subscript "n". The position vector $P_n$ for a location in the local NED system is denoted by $$P_n = \begin{bmatrix} x_n \\ y_n \\ z_n \end{bmatrix}. \quad (6)$$

A vehicle carried NED coordinate system is associated with the tow body 10. The origin is defined as the acoustic center of the linear sensor array 20. The vehicle carried NED coordinate directions, denoted by the subscript "nv", are parallel to the local NED coordinates. Thus, the x-axis ($x_{nv}$) points toward geodetic North, the y-axis ($y_{nv}$) points East, and the z-axis ($z_{nv}$) points down. The position vector $P_{nv}$ for a location in the vehicle carried NED system is denoted by $$P_{nv} = \begin{bmatrix} x_{nv} \\ y_{nv} \\ z_{nv} \end{bmatrix}. \quad (7)$$

The array (or acoustic) coordinate system is defined by the linear sensor array 20 carried by the tow body 10 and carries the subscript "a". The origin is coincident with the center of the acoustic aperture. The x-axis ($x_a$) is perpendicular to the line passing through the sensors of the linear sensor array 20 and oriented in the direction of motion when the tow body 10 is operated in straight and level flight. Level flight in this context is that the $x_a$-$y_a$ formed by the coordinates of the linear sensor array 20 is parallel in the $x_{nv}$-$y_{nv}$ plane of the vehicle carried NED coordinate system.

The y-Axis ($y_a$) is co-linear with the line passing through the sensors 22 and oriented to starboard. The z-Axis ($z_a$) defined by a right hand coordinate system is oriented down in flat and level flight. The position vector $P_a$ for a location in the array system is denoted as $$P_a = \begin{bmatrix} x_a \\ y_a \\ z_a \end{bmatrix}. \quad (8)$$

Projection of a beam pattern onto the seafloor 500 begins with a series of coordinate transformations. In particular, the set of seafloor locations that are contained within an area where the linear sensor array 20 would be capable of detecting a ULB signal are transformed from the local NED system of coordinates into the array coordinates by the algorithms that follow. Following this coordinate transformation; the beam pattern is projected onto the seafloor 500 where the result is interpreted as a likelihood function used to represent the area of the seafloor from which the detected ULB signal was likely to have originated.

Seafloor grid locations are first transformed from positions $P_n$ in the local NED system to positions $P_{nv}$ in the vehicle carried NED system of coordinates as $$P_{nv} = P_n - PA_n \quad (9)$$

where $PA_n$ is the position of the linear sensor array 20 in the local NED system.

Seafloor grid locations are then rotated from their positions in the vehicle carried NED system into the array system of coordinates. The array system of coordinates is centered on the acoustic source array and is illustrated in FIG. 4 and the array system is also illustrated in FIG. 7 with the other coordinate systems used.

The angular orientation of the linear sensor array 20 relative to the vehicle carried NED system is defined by the set of Euler angles that describe the yaw, pitch and roll of the tow body 10. The Euler angles are provided by the magnetic heading and gravity sensors that are included in the tow body 10. The Euler angles change with time and are detected by the magnetic heading and gravity sensors.

The yaw angle $\psi_{nv}$ is the angle from the vehicle carried NED $x_{nv}$ axis to the projected vector of the array $x_a$ axis on the $x_{nv}$-$y_{nv}$ plane of the vehicle carried NED frame. The right hand rotation is taken about the vehicle carried NED $z_{nv}$ axis. The vehicle carried NED frame is transferred to a once rotated intermediate frame by a rotation matrix as $P_{i1} = P_{nv} R_{i1 \leftarrow nv}$ where $$R_{i1 \leftarrow nv} = \begin{bmatrix} \cos\psi_{nv} & \sin\psi_{nv} & 0 \\ -\sin\psi_{nv} & \cos\psi_{nv} & 0 \\ 0 & 0 & 1 \end{bmatrix}. \quad (10)$$

Each rotation is treated separately to make following the coordinate transformation easier to follow.

The pitch angle $\theta_{nv}$ is the angle from the $X_{i1}$ axis of the once rotated intermediate frame to the array frame $X_a$ axis. The right hand coordinate rotation is about the $Y_{i1}$ axis of the once rotated intermediate frame. The once rotated intermediate frame is transferred to a twice rotated intermediate frame by a rotation matrix "R" as $P_{i2} = P_{i1} R_{i2 \leftarrow i1}$ where $$R_{i2 \leftarrow i1} = \begin{bmatrix} \cos\theta_{nv} & 0 & -\sin\theta_{nv} \\ 0 & 1 & 0 \\ \sin\theta_{nv} & 0 & \cos\theta_{nv} \end{bmatrix}. \quad (11)$$

The roll angle $\phi_n$ is the angle from the $Y_{i2}$ axis (or $Z_{i2}$ axis) of the twice rotated intermediate frame to that of the body frame. The twice rotated intermediate frame is transferred to the array frame by a rotation matrix as $P_a = P_{i2} R_{a \leftarrow i2}$ where $$R_{a \leftarrow i2} = \begin{bmatrix} 1 & 0 & 0 \\ 0 & \cos\varphi_{nv} & \sin\varphi_{nv} \\ 0 & -\sin\varphi_{nv} & \cos\varphi_{nv} \end{bmatrix} \quad (12)$$

Finally, the positions on the seafloor 500 in the array (Cartesian) system of coordinates are converted to the spherical system of coordinates illustrated in FIG. 4 and described in Equations (3) and (4) as $$r_a = \sqrt{x_a^2 + y_a^2 + z_a^2}, \psi_a = \tan^{-1}\left(\frac{y_a}{x_a}\right) \text{ and } \theta_a = \cos^{-1}\left(\frac{z_a}{r_a}\right) \quad (13)$$

where $r_a$ is the distance from the origin of the array coordinate system to the seafloor grid location $P_a = [x_a, y_a, z_a]^T$ with T being the transpose operator. For this invention, the transpose operator is a standard operator in linear or matrix algebra. The transpose operator converts the row vector $P_a = [x_a, y_a, z_a]^T$ to a column vector as needed to complete the calculations. $P_a$ is the position vector that points from a center of the linear sensor array 20 to a location on the seafloor.

A likelihood function for the location of the ULB is then generated by projecting the detecting beam pattern(s) onto the seafloor 500. First, the domain of the seafloor 500 from which the linear acoustic sensor array 20 could possibly detect a ULB is identified. In practice, it is advantageous to project the beam pattern onto the seafloor 500 at some multiple of the detection range estimated by evaluation of the passive sonar Equations (1) and (2). Suitable multiples range from approximately two to four to ensure that the beam projection includes the location of the ULB, plus some margin.

The margin is based on the estimated detection range for the system and will be influenced by the local ambient noise intensity and also by the nature and arrangement of wreckage on the seafloor. For example: the ULB could be buried in sediment and shielded by aircraft wreckage; thereby making the ULB more difficult to detect. There is no direct measure of this margin.

The identified seafloor coordinates are then transformed from the local NED Cartesian system $P_{nv} = [x_{nv}, y_{nv}, z_{nv}]^T$ to the spherical system of array coordinates $P_a = [r_a, \Psi_a, \theta_a]^T$ by Equations (9) through (13).

The detecting beam pattern is then calculated at the angular directions $\psi_a, \theta_a$ over the set of seafloor grid points that reside within the determined multiple of the passive sonar maximum detection range. The seafloor projection of the detecting beam pattern is then normalized such that the sum over the projected area of seafloor is equal to one. The normalization occurs after the procedures in the succeeding paragraphs have been applied. Then the numerical values of the beam pattern projected onto the seafloor are divided by the sum of all of the (non-zero) numerical values projected onto the seafloor. This normalized beam projection map is then added to the maximum likelihood estimate which is the sum of all previous normalized beam projection maps. Thus, the beam projection is interpreted as a likelihood function that describes the location of the ULB.

The value of the likelihood function for the location of origin of a detected ULB signal is equal to either zero, or is proportional to the value of the detecting beam pattern at the angular location $\psi_a, \theta_a$ in array coordinates. Also, the likelihood that a detected ULB signal originated from a location not on the seafloor is equal to zero. Furthermore, the likelihood that a detected ULB signal originated from a location on the seafloor, and at a distance from the acoustic sensor array 20 that does not exceed the predetermined multiple of the passive sonar detection range is equal to one. Still further, the likelihood that a detected ULB signal originated from a location on the seafloor, and at a distance from the array that exceeds the predetermined multiple of the passive sonar detection range is equal to zero.

This process is repeated with each detection of a ULB signal, including detection of the same signal on more than one of the beams formed from the array data. The result is a map of seafloor grid locations, provided in the local NED system of coordinates, representing the spatial likelihood function for the location of the ULB.

Figure 8:
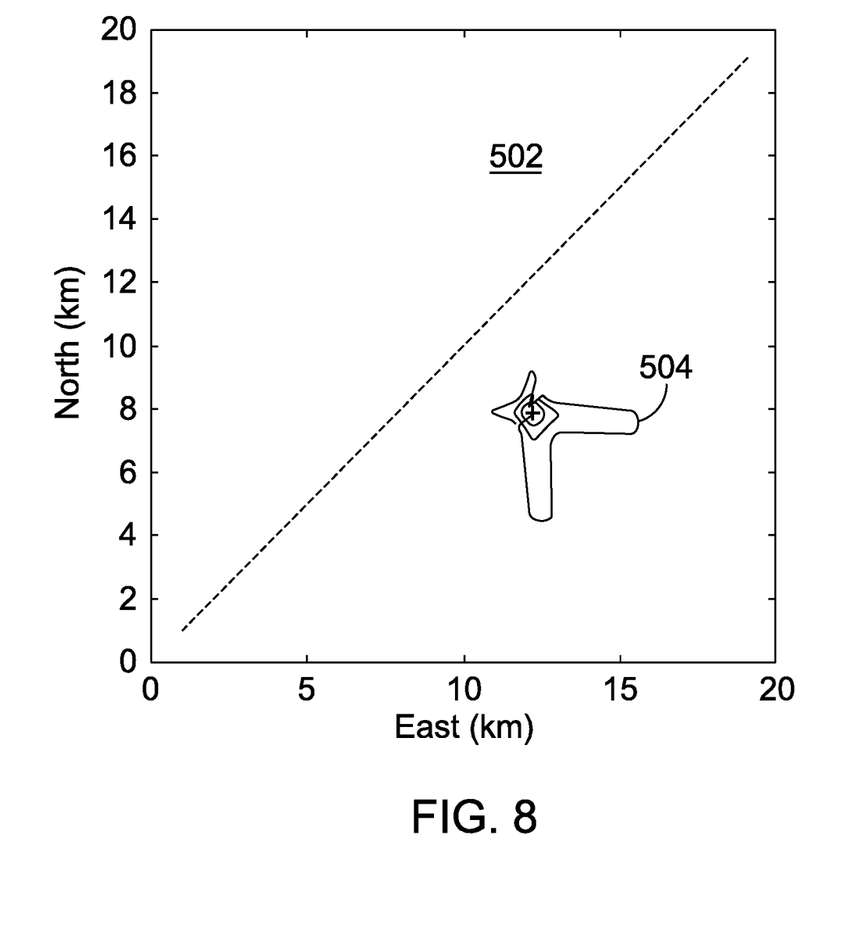
FIG. 8 is an illustration of the position estimate for the underwater location beacon located on the seafloor with the position presented in geographic coordinates.

The result of the process is illustrated in FIG. 8, where a seafloor grid 502 is represented in kilometers North and East of the local NED system origin. The dotted line of the illustration represents the track taken by the tow body 10 over the seafloor 500 during one leg of a typical search pattern. Contours to the southeast of the search track depict the likelihood function for the ULB location. The maximum likelihood location for the ULB is provided by the "+" marker located at grid position 12.12 kilometers east and 7.88 kilometers north of the local NED origin. The likelihood that the ULB is located at nearby locations diminishes with distance from the "+" marker as shown by the contour lines 504.

A noteworthy feature of the inventive method is that a map illustrating an estimate for the location for a ULB is generated in the course of a single pass by the tow body 10. The mapping uses data from the linear sensor array 20. It is also noteworthy that spurious detection of potential interfering sources, such as fathometers or other non-stationary acoustic transducers do not accumulate as false targets because their contributions to the maximum likelihood map are spatially dispersed in accordance with their movement.

The scope of the present invention was constrained to maintain compatibility with an existing system. Thus, the linear acoustic array 20 fits within the geometric constraints of known tow bodies. The electronics required for signal conditioning and communications will fit within the volume provided by an existing pressure vessel of the tow body 10.

Alternatives to present invention include the use of arrays with other geometries, such as a planar array, but these alternatives have greater complexity and expense compared to the relatively short and simple linear acoustic array 20 disclosed by this invention.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of locating an underwater location beacon, said method comprising of the steps of:
    providing a linear sensor array;
    providing a tow body containing signal conditioning and digital communication circuits operationally connected to the linear sensor array;
    moving the tow body and the linear sensor array in a direction of motion;
    orientating the linear sensor array orthogonal to the direction of motion;
    beamforming acoustic conical beams in a conical beam pattern from the linear sensor array onto a seafloor;

detecting with the acoustic conical beams subsequent to said beamforming step, a time series of acoustic data channels from the underwater location beacon;

converting with a frequency-wavenumber beamformer, the time series of acoustic data channels into spatial beams of an acoustic frequency spectra of frequencies;

determining if a signal of the underwater location beacon is present from each spatial beam;

calculating a likelihood function for a location of the underwater location beacon to represent an area of the seafloor from which the signal of the underwater location beacon is likely to have originated;

accumulating a plurality of likelihood functions for the location of the underwater location beacon over the course of a search pattern; and producing a grid map for a location of the underwater location beacon based on the accumulated likelihood functions.

2. The method in accordance with claim 1, wherein said beamforming step further comprises beamforming the conical beam pattern in a moving spherical coordinate system that is relative to the tow body onto a stationary Cartesian coordinate system defined relative to Earth.

3. The method in accordance with claim 2, said method further comprising the step of defining a local North-East-Down coordinate system as a reference for a search area for the underwater location beacon;

wherein the coordinate system is defined by three cardinal directions as geodetic North ($x_n$), geodetic East ($y_n$) and Down ($z_n$) with coordinate vectors denoted with subscript n; and wherein a position vector $P_n$ for a location in the local North-East-Down coordinate system is denoted by $$P_n = \begin{bmatrix} x_n \\ y_n \\ z_n \end{bmatrix}.$$

4. The method in accordance with claim 3, said method further comprising the step of associating a vehicle carried North-East-Down coordinate system with the tow body;

wherein an origin of the vehicle carried North-East-Down coordinate system is an acoustic center of the linear sensor array;

wherein directions of the vehicle carried North-East-Down coordinate system, denoted by the subscript "nv", are parallel to the local North-East-Down coordinates such that an x-axis ($x_{nv}$) points toward geodetic North, a y-axis ($y_{nv}$) points East, and a z-axis ($z_{nv}$) points down toward the Earth with a position vector $P_{nv}$ for a location in the vehicle carried North-East-Down system denoted as $$P_{nv} = \begin{bmatrix} x_{nv} \\ y_{nv} \\ z_{nv} \end{bmatrix}.$$

5. The method in accordance with claim 4, said method further comprising the step of defining an array coordinate system with the linear sensor array such that the array coordinate system carries a subscript a with an origin coincident with a center of an acoustic aperture of the linear array;

wherein an x-axis ($x_a$) is perpendicular to a line passing through acoustic sensors of the linear sensor array and oriented in the direction of motion when the tow body operates in level flight;

wherein an y-axis ($y_a$) is co-linear with a line passing through the sensors and oriented to starboard; and wherein an z-Axis ($z_a$) is defined by a right hand coordinate system is oriented down in the level flight with a position vector $P_a$ for a location in the array system denoted as $$P_a = \begin{bmatrix} x_a \\ y_a \\ z_a \end{bmatrix}.$$

6. The method in accordance with claim 5, said method further comprising the steps of:

transforming a seafloor grid location from a position $P_n$ in the local North-East-Down system to a position $P_{nv}$ in the vehicle carried North-East-Down system of coordinates as $P_{nv} = P_n - PA_n$ where $PA_n$ is a position of the linear sensor array in the local North-East-Down system; and rotating the seafloor grid location from the position $P_{nv}$ in the vehicle carried North-East-Down system of coordinates into the array system of coordinates.

7. The method in accordance with claim 6, said method further comprising the steps of:

determining an angular orientation of the linear sensor array relative to the vehicle carried North-East-Down system of coordinates by a set of Euler angles that describe a yaw angle, pitch angle and roll angle of the tow body with the Euler angles provided by magnetic heading and gravity sensors included in the tow body wherein the yaw angle $\psi_{nv}$ is an angle from the vehicle carried North-East-Down system of coordinates $X_{nv}$ axis to a projected vector of a $X_a$ axis of the linear sensor array on a $X_{nv}$-$Y_{nv}$ plane of the vehicle carried $X_a$ axis;

producing a right hand rotation about a frame of the vehicle carried North-East-Down system by coordinates of the $Z_{nv}$ axis;

transferring the vehicle carried frame to a once rotated intermediate frame by a rotation matrix as $P_{i1} = P_{nv} R_{i1 \leftarrow nv}$ where $$R_{i1 \leftarrow nv} = \begin{bmatrix} \cos\psi_{nv} & \sin\psi_{nv} & 0 \\ -\sin\psi_{nv} & \cos\psi_{nv} & 0 \\ 0 & 0 & 1 \end{bmatrix}.$$

wherein the pitch angle $\theta_{nv}$ is the angle from the $X_{i1}$ axis of the once rotated intermediate frame to a frame $X_a$ axis of the array coordinate system;

producing a right hand coordinate rotation about the $Y_{i1}$ axis of the once rotated intermediate frame;

transferring the once rotated intermediate frame to a twice rotated intermediate frame by a rotation matrix as $P_{i2} = P_{i1} R_{i2 \leftarrow i1}$ where $$R_{i2 \leftarrow i1} = \begin{bmatrix} \cos\theta_{nv} & 0 & -\sin\theta_{nv} \\ 0 & 1 & 0 \\ \sin\theta_{nv} & 0 & \cos\theta_{nv} \end{bmatrix}.$$

wherein the roll angle $\phi_n$ is the angle from the $Y_{i2}$ axis of the twice rotated intermediate frame to that of a frame of the vehicle carried North-East-Down coordinate system;

transferring the twice rotated intermediate frame to the vehicle frame by a rotation matrix as $P_a = P_{i2} R_{a \leftarrow i2}$ $$R_{a \leftarrow i2} = \begin{bmatrix} 1 & 0 & 0 \\ 0 & \cos\varphi_{nv} & \sin\varphi_{nv} \\ 0 & -\sin\varphi_{nv} & \cos\varphi_{nv} \end{bmatrix} ; \text{ and}$$

converting the array system of coordinates to a spherical system of coordinates as $$r_a = \sqrt{x_a^2 + y_a^2 + z_a^2}, \ \psi_a = \tan^{-1}\left(\frac{y_a}{x_a}\right) \text{ and } \theta_a = \cos^{-1}\left(\frac{z_a}{r_a}\right)$$

wherein $r_a$ is a distance from the origin of the array coordinate system to a seafloor grid location.

8. The method in accordance with claim 7, wherein said calculating a plurality of likelihood functions step further comprises transforming coordinates of the seafloor area from the local NED Cartesian system $P_{nv}=[x_{nv},y_{nv},z_{nv}]^T$ to the spherical system of array coordinates $P_a=[r_a,\Psi_a,\theta_a]^T$.

9. The method in accordance with claim 8, said method further comprising the steps of calculating the conical beam pattern at angular directions $\psi_a, \theta_a$ over a set of seafloor grid points within a maximum detection range; and normalizing a seafloor projection of the conical beam pattern a sum over a projected area of seafloor is equal to one;

dividing numerical values of the conical beam pattern by a sum of all of non-zero numerical values on the projected area of the seafloor such that a normalized beam projection map produced.

10. The method in accordance with claim 9, said method further comprising the steps of summing normalized beam projection maps to produce a maximum likelihood estimate.

* * * * *